(12) United States Patent
Fongaro et al.

(10) Patent No.: US 9,481,053 B2
(45) Date of Patent: Nov. 1, 2016

(54) MOVEMENT DEVICE, PARTICULARLY FOR CUTTING TORCHES OF THE PLASMA TYPE AND THE LIKE

(75) Inventors: Stefano Fongaro, Castronno (IT); Walter Zulauf, Ursenbach (CH); Christian Colombo, Milan (IT)

(73) Assignee: SAMSUNG ELECTRONICS CO. LTD., Suwon-Si, Gyeonggi-Do (KR)

(*) Notice: Subject to any disclaimer, the term of this patent is extended or adjusted under 35 U.S.C. 154(b) by 145 days.

(21) Appl. No.: 14/234,998

(22) PCT Filed: Sep. 11, 2012

(86) PCT No.: PCT/EP2012/067700
§ 371 (c)(1),
(2), (4) Date: Jan. 24, 2014

(87) PCT Pub. No.: WO2013/041404
PCT Pub. Date: Mar. 28, 2013

(65) Prior Publication Data
US 2014/0183171 A1   Jul. 3, 2014

(30) Foreign Application Priority Data
Sep. 19, 2011   (IT) .............. MI2011A1684

(51) Int. Cl.
B23K 10/00 (2006.01)
B23K 37/02 (2006.01)
B23K 9/013 (2006.01)
B23K 9/28 (2006.01)
B23K 7/00 (2006.01)

(52) U.S. Cl.
CPC ............ B23K 37/0288 (2013.01); B23K 7/00 (2013.01); B23K 9/013 (2013.01); B23K 9/287 (2013.01); B23K 10/00 (2013.01); B23K 37/0241 (2013.01); B23K 37/0247 (2013.01)

(58) Field of Classification Search
CPC .......... B23K 37/0288; B23K 37/0282; B23K 37/0241; B23K 23/0247; B23K 9/013; B23K 9/287; B23K 10/00; B23K 7/00
USPC ............ 219/121.39, 121.44, 121.45, 121.56, 219/121.67, 121.63
See application file for complete search history.

(56) References Cited

U.S. PATENT DOCUMENTS 5,061,834 A * 10/1991 Ziv .................... B23K 26/0884
219/121.67
6,201,207 B1   3/2001 Maruyama
(Continued)

FOREIGN PATENT DOCUMENTS

JP   58058979 A   4/1983

OTHER PUBLICATIONS

International Search Report for PCT/EP2012/067700 dated Dec. 4, 2012.
(Continued)

Primary Examiner — Mark Paschall
(74) Attorney, Agent, or Firm — Koppel, Patrick, Heybl & Philpott (57) ABSTRACT

A movement device, particularly for cutting torches of the plasma type, comprising a working head that can move along three Cartesian axes which are mutually perpendicular and supports a cutting torch for cutting mechanical pieces and the like, elements being comprised for the combined rotary and translational motion of the cutting torch with respect to the working head in order to vary the inclination of the cutting flow with respect to the mechanical piece or the like being worked on; the center of instantaneous rotation of the cutting torch, with respect to which the elements for combined rotary and translational motion operate, substantially coinciding with the focal point of the cutting torch.

14 Claims, 5 Drawing Sheets

(56) References Cited

U.S. PATENT DOCUMENTS

| | | | | |
|---|---|---|---|---|
| 8,260,443 B2 * | 9/2012 | Ehlerding | ............ | G05B 19/402 219/121.79 |
| 2010/0314361 A1 * | 12/2010 | Buccella | ................ | B23K 10/00 219/121.39 |
| 2011/0210110 A1 * | 9/2011 | Dearman | ............. | B23K 9/0206 219/137 R |

OTHER PUBLICATIONS

Italian Search Report for IT MI20111684 dated May 9, 2012.

* cited by examiner

MOVEMENT DEVICE, PARTICULARLY FOR CUTTING TORCHES OF THE PLASMA TYPE AND THE LIKE

The present invention relates to a movement device for plasma cutting and the like, for cuts in two and three dimensions.

Nowadays, for metal cutting in general, such as steel and other metallic alloys, or for cutting other materials, a huge variety of methods is available which do not require physical contact between a tool and the piece to be cut.

Of these methods, plasma cutting is known, which consists, substantially, in ejecting a gas at high speed from a nozzle and creating an electric arc in the gas between an electrode and the surface to be cut, in such a manner as to transform the gas into plasma.

The plasma thus obtained transfers heat to the metallic material until it is brought to the melting temperature and thus its continuity is broken.

In this technology, as in other, similar technologies, the nozzle through which the plasma flow exits is provided on a cutting torch which is supported by a movement device of the multi-body type which, by means of a plurality of motors and kinematic linkages, enables the movement, positioning and orientation in space of the torch.

Such technology is not however devoid of drawbacks, among which is the fact that, if the torch has to follow a preset cutting path, conventional movement devices do not allow a fluidity of movement of the focal point of the torch which is such as to obtain a cut executed in continuous movement which is sufficiently free from burring and cutting inaccuracies owing to pauses in and/or resumptions of the plasma flow along the preset cutting path.

Another drawback of the conventional technology consists in that, if inclined cuts are required with continual changes of inclination, the inertia of the individual rigid bodies that make up the above-mentioned multi-body system and the continual accelerations and decelerations to which the cutting torch is subjected result in inaccuracies of positioning in space of the focal point of the torch, with consequent reduction in the quality of the cut made.

This drawback is substantially due to the inertia of the system, in that, for each degree of freedom of the system, there is an electric motor which is generally mounted proximate to the joint on which the degree of freedom is provided.

In this way, the electric motors, the mass of which is significant, weigh down the system considerably thus forcing it to operate with reduced acceleration and deceleration values, with consequent lengthening of working times.

Another drawback of the movement devices described consists in that, during the movement of the torch, the supply cable of the latter undergoes a series of furls onto itself and tensions which are such as to necessitate rotations of the cutting torch that are adapted to loosen this cable, so as to prevent it from breaking.

In fact, typically, with current systems it is possible to make the cutting torch perform at the most two or three turns on itself before the cable breaks.

The aim of the present invention is to provide a movement device that is capable of overcoming the limitations and drawbacks of the known art.

Within this aim, an object of the present invention is to devise a movement device that is particularly adapted to plasma cutting torches for straight and inclined cuts but which can with suitable modifications also be used for cutting technologies other than plasma cutting such as, for example, laser cutting torches, gas cutting torches or oxyhydrogen flame cutting torches.

This aim and these and other objects which will become more apparent hereinafter are achieved by a movement device, particularly for cutting torches of the plasma type, comprising a working head, that can move along three Cartesian axes which are mutually perpendicular, and supports a cutting torch for cutting mechanical pieces and the like, means for the combined rotary and translational motion of said cutting torch with respect to said working head being further comprised in order to vary the inclination of the cutting flow with respect to said mechanical piece or the like being worked, characterized in that the center of instantaneous rotation of said cutting torch with respect to which said means for combined rotary and translational motion operate coincides substantially with the focal point of said cutting torch.

Further characteristics and advantages of the present invention will become more apparent from the detailed description of a preferred, but not exclusive, embodiment of a movement device, particularly for cutting torches of the plasma type, which is illustrated by way of non-limiting example in the accompanying drawings wherein:

With reference to the figures, the movement device, particularly for cutting torches of the plasma type, generally designated by the reference numeral 1, comprises a working head 2 that can move along three Cartesian axes 3, 4 and 5 which are mutually perpendicular and supports a cutting torch 7 for cutting mechanical pieces and the like.

More precisely, as will be described in more detail later, the working head 2 is associated with a frame 8 which supports a workstation that is known to the person skilled in the art and is therefore not described in detail.

Moreover, means are comprised for the combined rotary and translational motion 9 of the cutting torch 7 with respect to the working head 2 so as to vary the inclination of the cutting flow 10 with respect to the piece being worked on.

According to the invention, the center of instantaneous rotation of the cutting torch 7, with respect to which the means for combined rotary and translational motion 9 operate, substantially coincides with the focal point 11 of the cutting torch 7.

In this way, during every movement of the cutting torch 7, which in the exemplary embodiment shown here is of the plasma type but which in other embodiments, not shown, can also be of the laser, gas, or oxyhydrogen flame type, the cutting torch 7 is always trained on the same point without ever deviating from or interrupting the preset cutting path.

Advantageously, in order to implement this characteristic, the cutting torch 7 can rotate with respect to the working head 2 and, respectively, about a first axis of revolution 12 which is substantially parallel to a first Cartesian axis 4, passing through the focal point 11, and about a second axis of revolution 13 which is substantially perpendicular to the first axis of revolution 12.

More specifically, the working head 2 comprises a box-like body 14 which is slideably associated with the frame 8 along two straight guides, which are not shown and belong to the frame 8, and are substantially parallel, respectively, to a second and to a third Cartesian axis 3 and 5.

In this manner, the two straight guides lie on a plane the perpendicular of which coincides with the first axis of revolution 12.

This box-like body 14 is able to perform a translational motion along the first Cartesian axis 4 by means of a first rack-type coupling 15 which can be actuated by first drive means 16 which are accommodated inside the box-like body 14.

More precisely, the first drive means 16 and the first rack-type coupling 15 comprise a first electric motor 17, which is associated with a first speed reduction unit 18, on the output shaft of which a first pinion 19 is keyed and engages a first rack 20 which is integral with the frame 8.

In addition the working head 2 comprises an impeller 21 which supports the cutting torch 7 and is accommodated rotatably in the box-like body 14 by means of a first gear 22 which can be actuated by second drive means 23 which are accommodated in the box-like body 14.

More precisely, the first gear 22 and the second drive means 23, which define part of the means for combined rotary and translational motion 9, comprise a second electric motor 24 which is associated with a second speed reduction unit, not shown in the figures, on the output shaft of which a second pinion 25 is keyed and engages a first gearwheel 26 which is integral in rotation with the impeller 21.

As shown in the figures, the cutting torch 7 is associated with the working head 2 by way of two supporting arms 27 and 28 of which the first one is integral with the impeller 21 and the second one is associated with the cutting torch 7.

More precisely, the first supporting arm 27 extends from the impeller 21 substantially parallel to the first axis of revolution 12 in the direction of the region where the mechanical piece will be worked and eccentrically with respect to the first axis of revolution 12.

Differently, the second supporting arm 28 is kinematically associated with the first supporting arm 27 by way of an articulated quadrilateral structure 29 which lies on a plane which is substantially parallel to the first axis of revolution 12 and can be actuated by third drive means 30 which are accommodated inside the box-like body 14 by means of mechanical transmission elements which are defined inside the supporting arms 27 and 28.

Advantageously, in this way, the cutting torch 7 is kinematically connected to the mechanical transmission elements for its rotation about the second axis of revolution 13 which is opposite to the direction of rotation of the second supporting arm 28 relative to the first supporting arm 27.

More precisely, the third drive means 30 and the mechanical transmission elements, which together with the articulated quadrilateral structure 29 define part of the means for combined rotary and translational motion 9, comprise a third electric motor 31 which is associated with a third speed reduction unit, not shown in the figures, on the output shaft of which a third pinion 32 is keyed and engages a second toothed wheel 33 which is rotatably fitted on the shaft of the impeller 21.

More precisely, the second toothed wheel 33 is integral in rotation with a third toothed wheel 34 which is rotatably fitted over the shaft of the impeller 21 and associated kinematically with a screw-and-nut coupling 35, for example of the recirculating ball type, of which at least a part is accommodated in the first supporting arm 27 and which produces a translational motion of a second rack 36 which engages two actuation pinions 37 and 38 of the articulated quadrilateral structure 29.

In the embodiment proposed, the articulated quadrilateral structure 29 comprises two linkages 39 and 40, which are integral in rotation, at their ends, with the actuation pinions 37 and 38 and with two driving pulleys 41 and 42 which are accommodated within the second supporting arm 28 and one of which is connected, by way of a belt transmission 43, to a driven pulley 44 which is provided on an actuation shaft 45 associated with a supporting base 46 of the cutting torch 7.

Conveniently, in the proposed embodiment, a belt tightening pulley 50 is provided.

Conveniently, in order to make the center of instantaneous rotation of the cutting torch 7, with respect to which the means for combined rotary and translational motion 9 operate, coincide with the focal point 11 of the cutting torch 7, the axis of the actuation shaft 45 coincides with the second axis of revolution 13 and the distance between the pivots of each one of the linkages 39 and 40 is equal to the distance between the focal point 11 and the second axis of revolution 13, so that the linkages 39 and 40 are always oriented parallel to the second axis of revolution 13.

In this way, all the drive means 16, 23 and 30, including their electrical wiring, are integral in translational motion with the sole working head 2 thus leaving the cutting torch 7 free to move with respect to them without their inertia influencing the movement of the cutting torch 7.

Moreover, in order to prevent damage to the cutting torch 7 in the event of accidental collisions with the mechanical piece or the like being worked, collision prevention means 51 are provided which comprise elastic means 52, provided for example by traction springs, which are associated both with the main body 53 of the cutting torch 7, which can be inserted with a shape coupling and in abutment in a hole 54 formed on the supporting base 46, and with the supporting base 46 so as to keep this main body 53 in abutment in the hole 54.

In this manner, the main body 53 and thus the cutting torch 7 can be at least partially extracted from the hole 54 in contrast to the action of the elastic means 52 in the event of a collision.

Means for preventing the rotation of the supply cable of the cutting torch 7 can advantageously be provided comprising a slider 61 which is slideably accommodated in a tubular body 60 that extends from the impeller 21 on the side opposite to that of the cutting torch 7 in contrast to and due to the action of second elastic means 63 which consist, for example, of a helical spring which is interposed between the slider 61 and the impeller 21.

More precisely, the tubular body 60 extends along the first axis of revolution 12, passing through all of the impeller 21. The slider 61 is thus integral in rotation with the tubular body 60 due to grooved guides 62, which prevent rotations relative to each other, allowing them to perform translational movements only, and the supply cable of the cutting torch 7, which for the sake of graphic simplicity is not shown, is integral with the slider 61, making it slide along the tubular body 60 when the cable is live.

Operation of the movement device 1, particularly for cutting torches of the plasma type or the like, is described hereinafter.

The positioning of the cutting torch 7 in the three-dimensional space identified by the triplet of Cartesian axes 3, 4 and 5 occurs by means of the sliding of the working head 2 along the straight guides of the frame 8, which enable the translational motion of the working head 2 on a plane that is substantially parallel to the working surface on which the mechanical piece to be worked is placed, and by means of the actuation of the first drive means 16, which enable the translational motion of the working head 2 away from or toward the mechanical piece to be worked.

During such translational movements, the cutting torch 7 can undergo combined rotations about the two axes of revolution 12 and 13 so that the center of instantaneous rotation of these combined rotations coincides with the focal point 11 of the cutting torch 7.

More precisely, this kinematic restriction comes about thanks to the articulated quadrilateral structure 29, by way of which the same rotation imposed on the second supporting arm 28 relative to the first supporting arm 27 is imposed in the opposite direction on the actuation shaft 45, which is responsible for the rotation of the cutting torch 7 about the second axis of revolution 13.

In this way the plasma flow of the cutting torch 7 can undergo variations in orientation with respect to the mechanical piece being worked without physically moving the focal point of the cutting torch 7.

Figure 1:
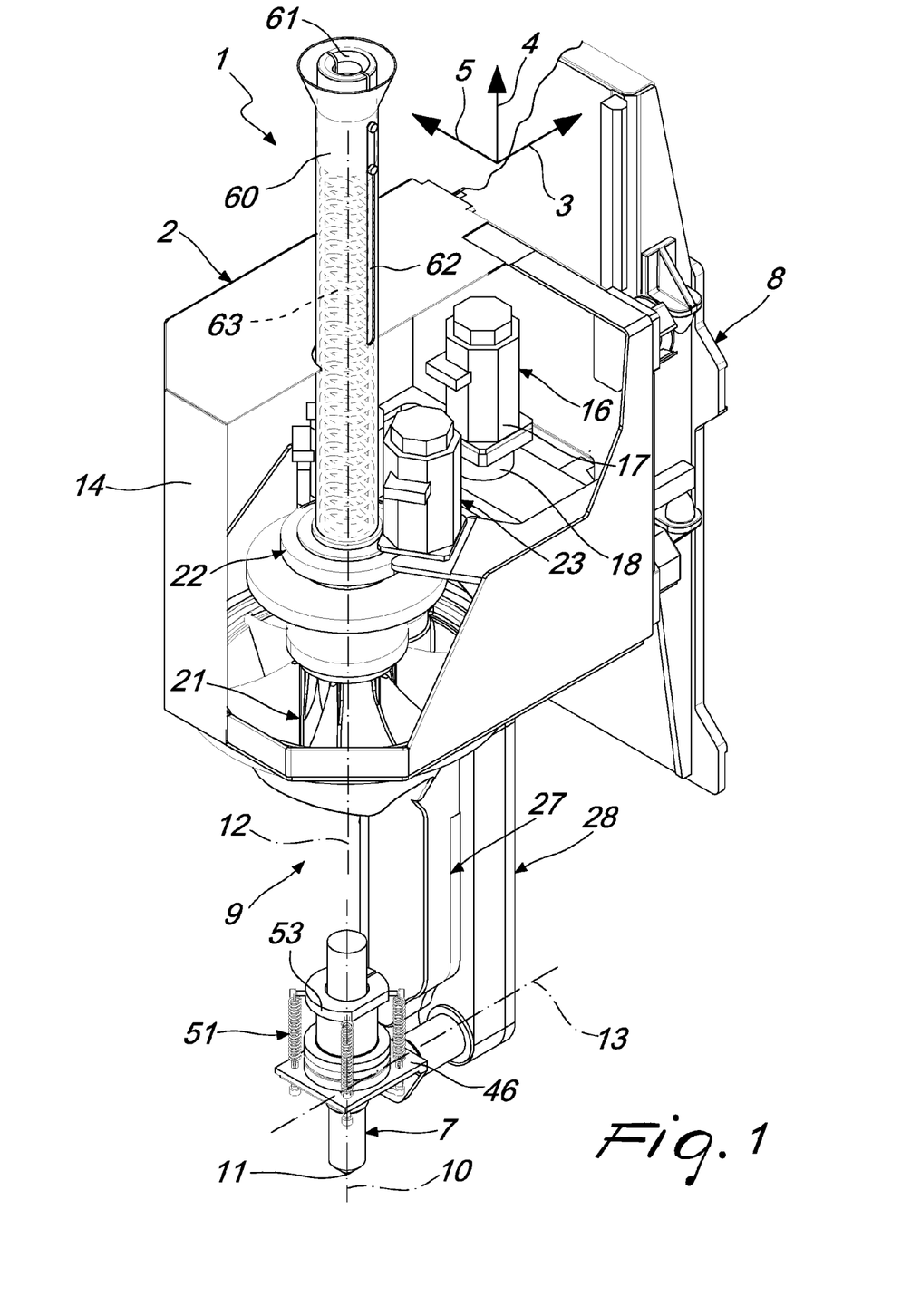
FIG. 1 is a partially sectional perspective view of the movement device, particularly for cutting torches of the plasma type, according to the invention.
Figure 2:
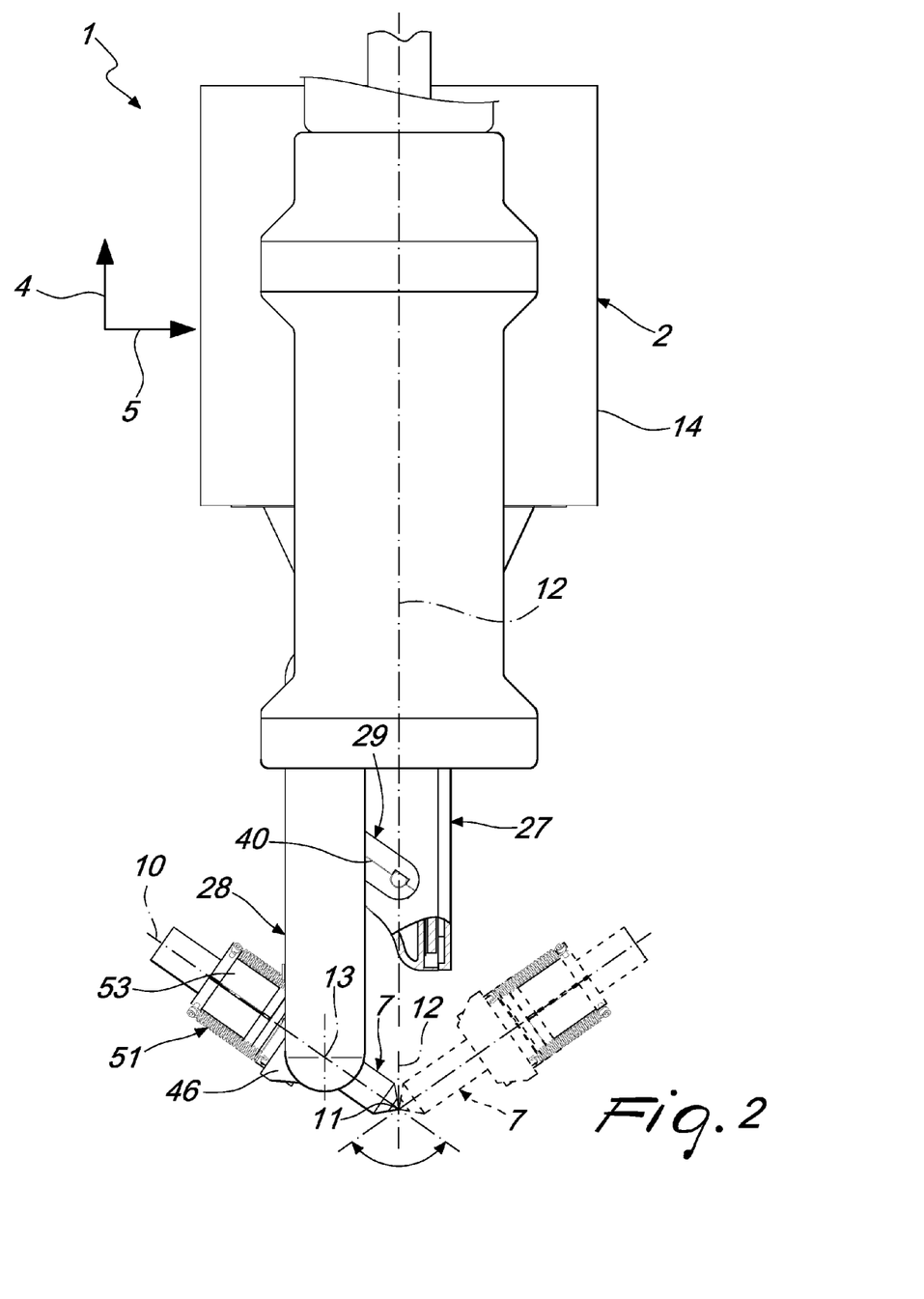
FIG. 2 is a rear elevation view of the movement device shown in FIG. 1.
Figure 3:
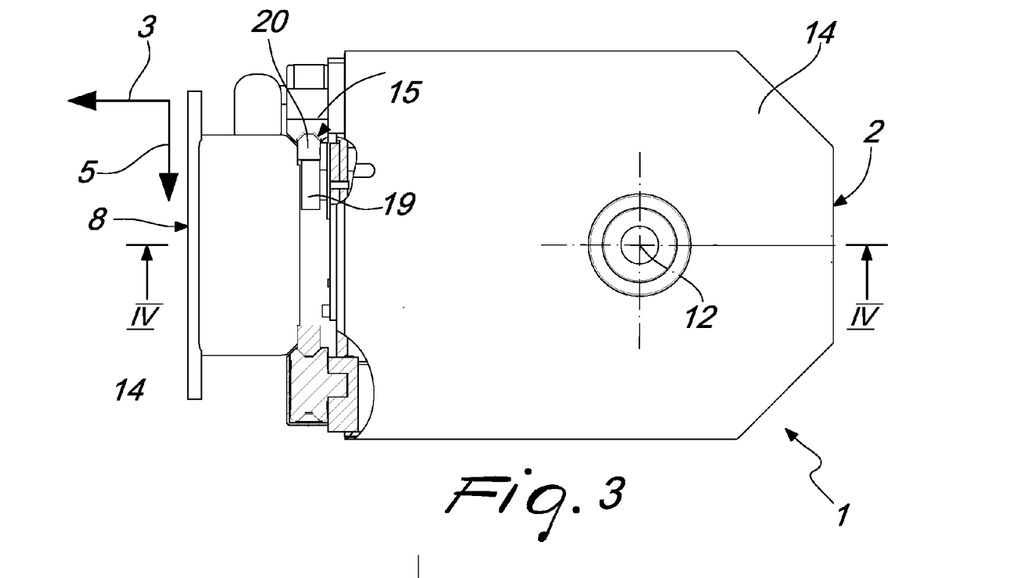
FIG. 3 is a plan view from above of the movement device shown in FIG. 1.
Figure 4:
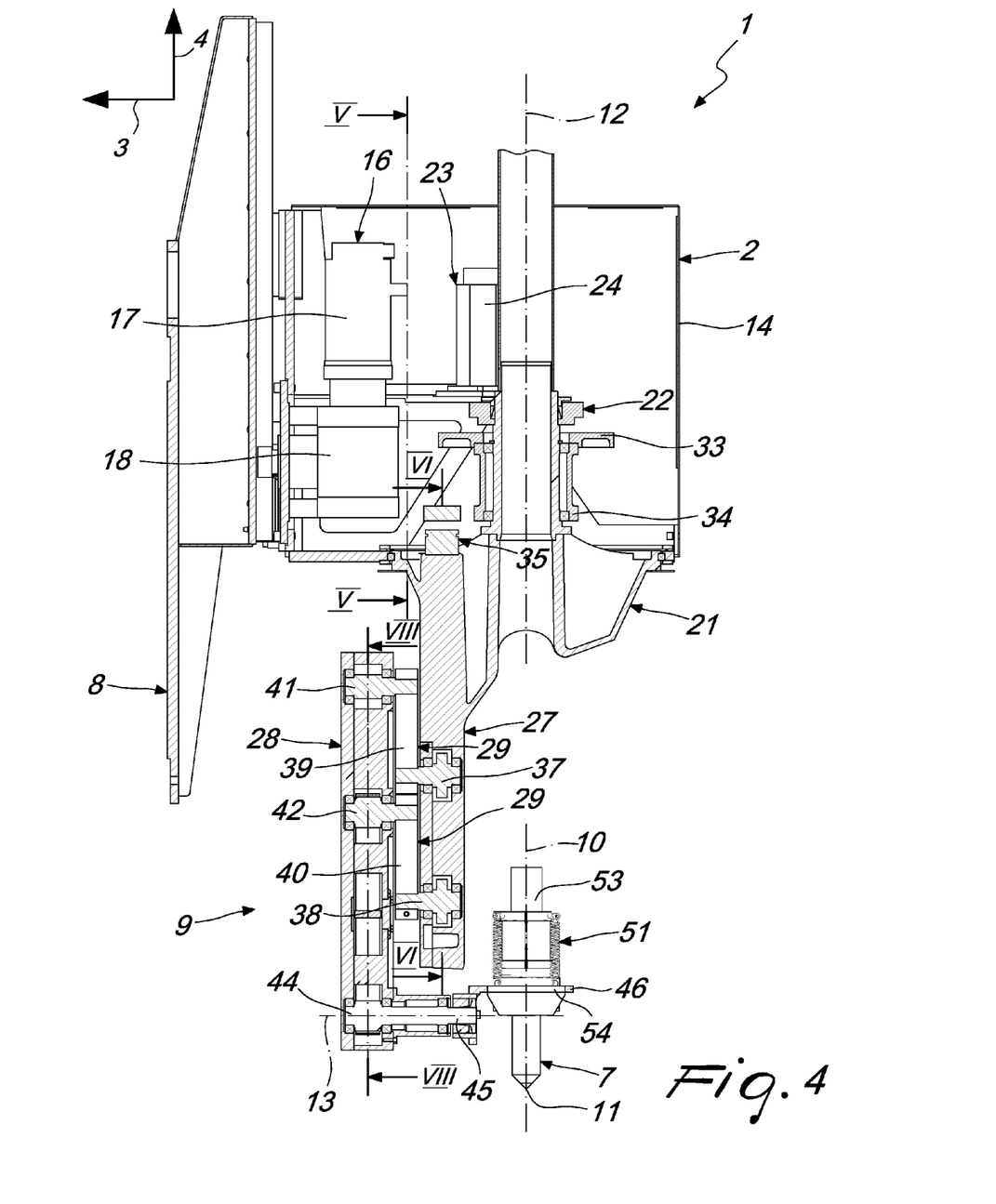
FIG. 4 is a sectional view of the movement device shown in FIG. 3, along the line IV-IV.
Figure 5:
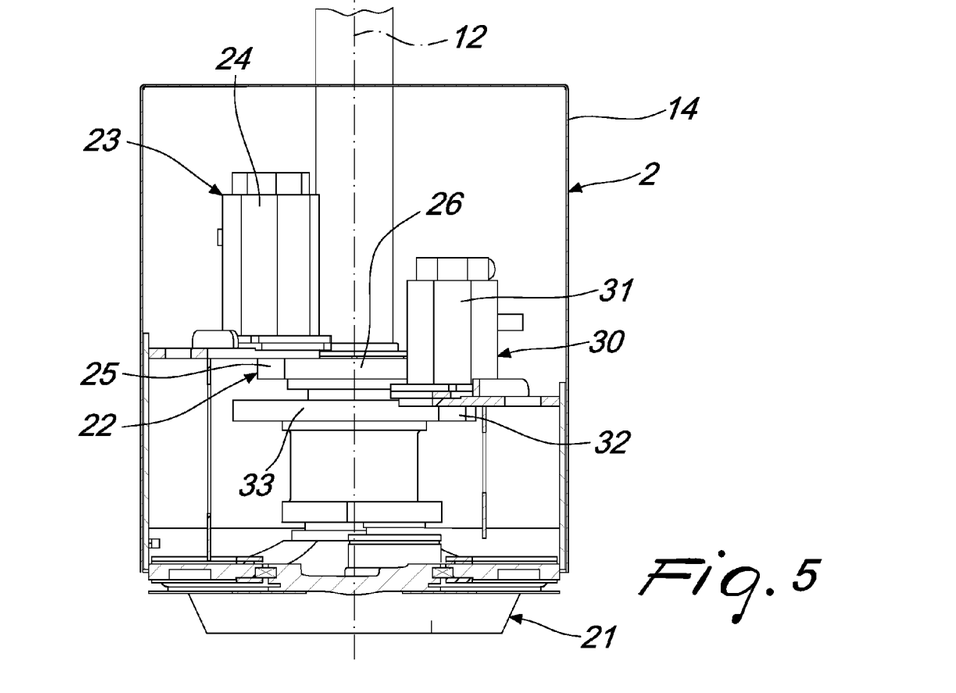
FIG. 5 is a sectional view of the movement device shown in FIG. 4, along the line V-V.
Figure 6:
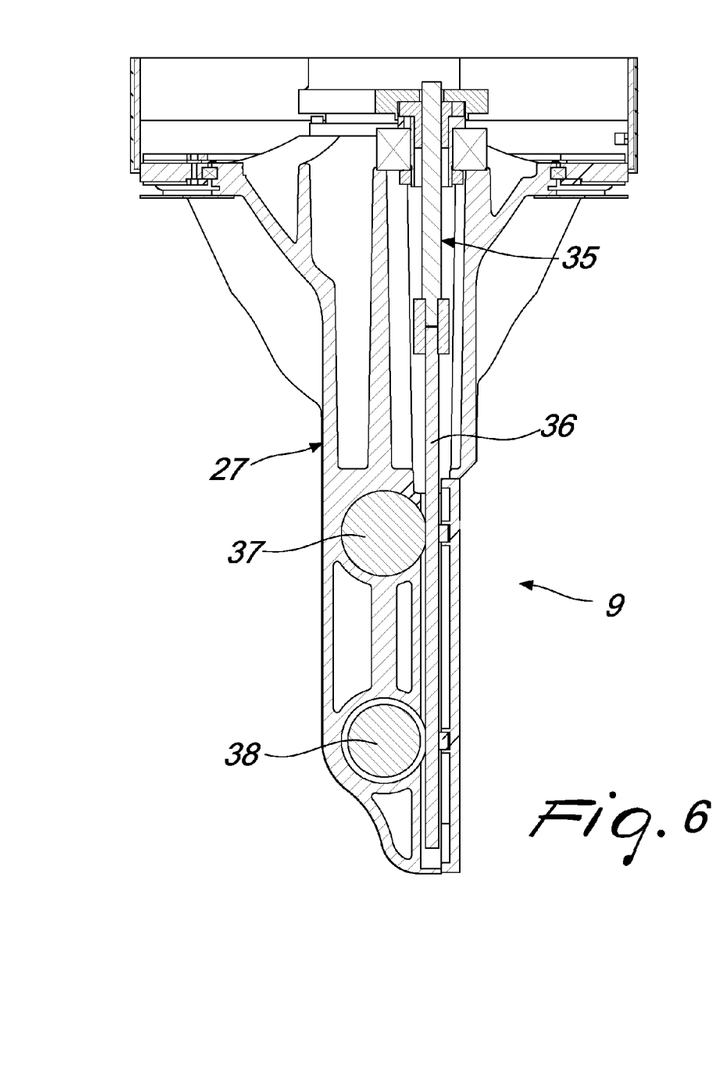
FIG. 6 is a sectional view of the movement device shown in FIG. 4, along the line VI-VI.
Figure 7:
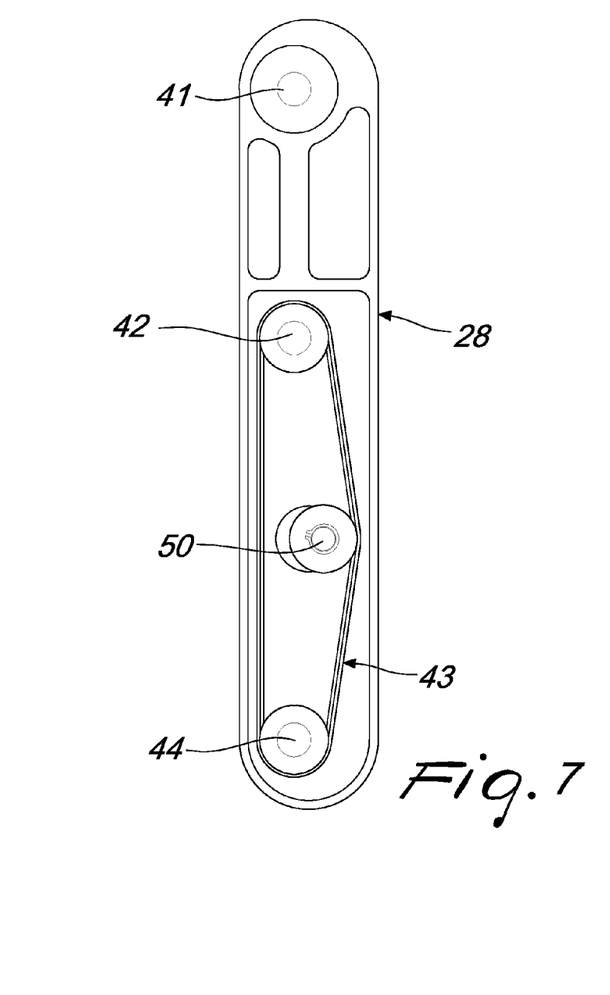
FIG. 7 is a sectional view of the movement device shown in FIG. 4, along the line VII-VII.

By combining this rotation about the second axis of revolution 13 with the rotation of the impeller 21 about the first axis of revolution 12, the plasma flow can function in a working cone the vertex of which coincides with the focal point of the cutting torch 7, as shown in FIG. 2.

For example, in a possible configuration of the movement device 1, such cone can have an angular extension of 110°.

During the movement of the cutting torch 7, its supply cable can undergo tensions which may lead to the breakage of the cable, if the rotation-preventing means described previously were not provided.

In fact, following the tensioning of the supply cable, the slider 61, to which the cable is fixed, slides along inside the tubular body 60 in contrast to the action of the second elastic means 63 which are compressed, promoting the tensioning of the cable.

Once this tensioning has ceased, as a consequence of the second elastic means 63, the supply cable re-enters the tubular body 60.

In this manner, it is possible to prevent the tensioning of the cable from making the cutting torch 7 perform a high number of turns with respect to the working head 2 without the supply cable risking breakage.

In practice it has been found that the movement device, particularly for cutting torches of the plasma type, according to the invention, fully achieves the intended aim and objects in that it makes it possible to move a cutting torch in a fluid and constant manner without the inertias of the motors influencing the precision of positioning.

In particular, the positioning of all the motors in a position away from the moving elements of the cutting device makes it possible to not have significant masses in motion and to concentrate the inertial masses in a single point.

This enables the movement device according to the invention to operate with high acceleration and deceleration values, so as to reduce working times with respect to what is possible with the known art, without losing precision of cutting.

The movement device, particularly for cutting torches of the plasma type, thus conceived is susceptible of numerous modifications and variations, all of which are within the scope of the appended claims.

Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. MI2011A001684 from which this application claims priority are incorporated herein by reference.

The invention claimed is:

1. A movement device, particularly for cutting torches of the plasma type and the like, comprising a working head that can move along three Cartesian axes which are mutually perpendicular and supports a cutting torch for cutting mechanical pieces, means for the combined rotary and translational motion of said cutting torch with respect to said working head being further comprised in order to vary the inclination of the cutting flow with respect to said mechanical piece, wherein a center of instantaneous rotation of said cutting torch with respect to which said means for combined rotary and translational motion operate coincides substantially with the focal point of said cutting torch, wherein said means for combined rotary and translational motion comprises drive means which are integral in translation motion with the sole working head.

2. The movement device according to claim 1, wherein said cutting torch can rotate with respect to said working head, respectively, about a first axis of revolution, which is substantially parallel to a first one of said Cartesian axes and about a second axis of revolution, which is substantially perpendicular to said first axis of revolution, said focal point being arranged along said first axis of revolution.

3. The movement device according to claim 1, wherein said working head comprises a box-like body which is slideably associated with a frame along two straight guides that belong to said frame and are substantially parallel, respectively, to a second one and a third one of said Cartesian axes, said box-like body being able to perform a translational motion along said first Cartesian axis by means of a first rack-type coupling which can be actuated by first drive means accommodated inside said box-like body.

4. The movement device according to claim 3, wherein said first drive means and said first rack-type coupling comprise a first electric motor, which is associated with a first speed reduction unit, on the output shaft of which a first pinion is keyed and engages a first rack which is integral with said frame.

5. The movement device according to claim 3, wherein said working head comprises an impeller which supports said cutting torch and is accommodated rotatably within said box-like body by means of a first gear which can be actuated by second drive means which are accommodated in said box-like body, said first gear and said second drive means defining part of said means for combined rotary and translational motion.

6. The movement device according to claim 5, wherein said second drive means and said first gear comprise a second electric motor, which is associated with a second speed reduction unit on the output shaft of which a second pinion is keyed and engages a first toothed wheel which is integral in rotation with said impeller.

7. The movement device according to claim 5, wherein said cutting torch is associated with said working head by way of two supporting arms, of which the first one is integral with said impeller and the second one is associated with said cutting torch, said first supporting arm extending from said impeller substantially parallel to said first axis of revolution eccentrically with respect to said first axis of revolution and said second supporting arm being associated kinematically with said first supporting arm by way of an articulated quadrilateral structure, which lies on a plane which is substantially parallel to said first axis of revolution and can be actuated by third drive means, which are accommodated within said box-like body, by means of mechanical transmission elements which are defined inside said supporting arms, said articulated quadrilateral structure, said third drive means and said mechanical transmission elements defining part of said means for combined rotary and translational motion, said cutting torch being connected kinematically to said mechanical transmission elements for its opposite rotation about said second axis of revolution with respect to the direction of rotation of said second supporting arm relative to said first supporting arm.

8. The movement device according to claim 7, wherein said third drive means and said mechanical transmission elements comprise a third electric motor, which is associated with a third speed reduction unit on the output shaft of which a third pinion is keyed and engages a second toothed wheel which is fitted rotatably on the shaft of said impeller, said second toothed wheel being integral in rotation with a third toothed wheel, which is fitted rotatably on the shaft of said impeller and is associated kinematically with a screw-and-nut coupling which is accommodated at least partly in said first supporting arm and produces a translational motion of a second rack, which engages two actuation pinions of said articulated quadrilateral structure.

9. The movement device according to claim 8, wherein said articulated quadrilateral structure comprises two linkages, which are integral in rotation, at their ends, with said actuation pinions and with two driving pulleys which are accommodated within said second supporting arm and one of which is connected, by way of a belt transmission, to a driven pulley, which is provided on an actuation shaft associated with a supporting base of said cutting torch, the axis of said actuation shaft coinciding with said second axis of revolution, the distance between the pivots of each one of said linkages being equal to the distance between said focal point and said second axis of revolution, said linkages being oriented parallel to said second axis of revolution.

10. The movement device according to claim 7, wherein said drive means are integral in translational motion with said working head.

11. The movement device according to claim 1, further comprising means for preventing the collision of said cutting torch with said mechanical piece.

12. The movement device according to claim 11, wherein said cutting torch comprises a main body which can be inserted with a shape coupling and in abutment in a hole which is formed in said supporting base, and wherein said collision prevention means comprise elastic means which are associated both with said main body and with said supporting base in order to keep said main body in abutment in said hole, said main body being at least partially removable from said hole in contrast to the action of said elastic means.

13. The movement device according to claim 5, further comprising means for preventing the rotation of the supply cable of said cutting torch which comprise a slider which is slideably accommodated in a tubular body that extends from said impeller on the side opposite to said cutting torch in contrast to, and by way of the action of, second elastic means which are interposed between said slider and said impeller, said slider being integral in rotation with said tubular body and said supply cable of said cutting torch being integral with said slider.

14. The movement device according to claim 1, wherein said cutting torch is of the plasma type.

\* \* \* \* \*